United States Patent
Kobayashi

(10) Patent No.: US 8,024,604 B2
(45) Date of Patent: Sep. 20, 2011

(54) INFORMATION PROCESSING APPARATUS AND ERROR PROCESSING

(75) Inventor: Tomohiro Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 12/406,400

(22) Filed: Mar. 18, 2009

(65) Prior Publication Data

US 2009/0249031 A1    Oct. 1, 2009

(30) Foreign Application Priority Data

Mar. 31, 2008    (JP) .................... 2008-094160

(51) Int. Cl.
*G06F 11/00* (2006.01)
(52) U.S. Cl. ................ 714/10; 714/15; 714/48
(58) Field of Classification Search ............. 714/10, 714/15, 48
See application file for complete search history.

(56) References Cited

U.S. PATENT DOCUMENTS

| | | | | |
|---|---|---|---|---|
| 5,572,662 A * | 11/1996 | Ohta et al. | ............... | 714/11 |
| 6,035,417 A | 3/2000 | Kanazawa | | |
| 6,119,246 A * | 9/2000 | McLaughlin et al. | ......... | 714/27 |
| 6,622,260 B1 * | 9/2003 | Marisetty et al. | ........... | 714/10 |
| 6,948,092 B2 * | 9/2005 | Kondo et al. | ............... | 714/12 |
| 7,266,726 B1 * | 9/2007 | Ladd et al. | ............... | 714/27 |
| 2005/0015664 A1 * | 1/2005 | Johnson et al. | ........... | 714/15 |
| 2007/0168718 A1 * | 7/2007 | Reblewski et al. | ......... | 714/15 |

FOREIGN PATENT DOCUMENTS

| | | |
|---|---|---|
| JP | 07-036721 | 2/1995 |
| JP | 07-262034 | 10/1995 |

* cited by examiner

*Primary Examiner* — Charles Ehne
(74) *Attorney, Agent, or Firm* — Staas & Halsey LLP

(57) ABSTRACT

An information processing apparatus includes a first processing unit, a second processing unit, and a common storage unit that is commonly accessed by the first processing unit and the second processing unit. The first processing unit writes a request in the common storage unit for requesting the second processing unit to perform a certain process, and notifies the second processing unit of the request. The second processing unit writes a notification in the common storage unit indicating the process is completed in response to the request.

13 Claims, 9 Drawing Sheets

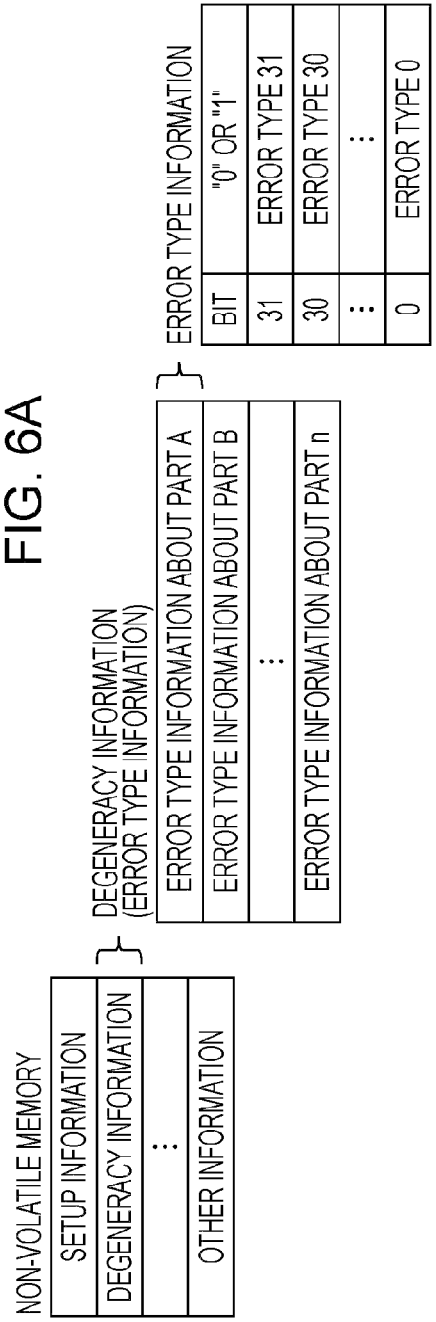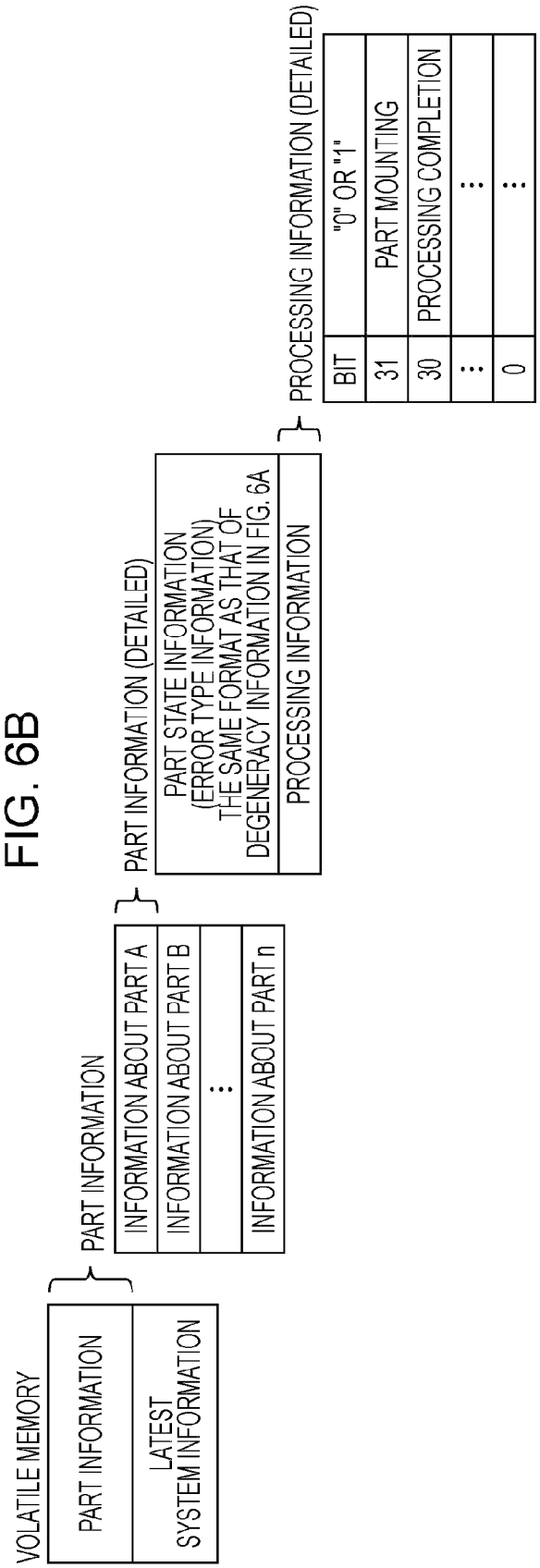

INFORMATION PROCESSING APPARATUS AND ERROR PROCESSING

CROSS-REFERENCE TO RELATED APPLICATIONS

This application is related to and claims priority to Japanese patent application No. 2008-94160 filed on Mar. 31, 2008 in the Japan Patent Office, and incorporated by reference herein.

FIELD

An embodiment of the present invention discussed herein is related to an information processing apparatus. For example, an embodiment of the present invention is related to a state takeover technology on occurrence of abnormal interruption in asynchronous information notification in an information processing apparatus.

BACKGROUND

Various methods are proposed to handle abnormal states occurring in information processing apparatuses.

For example, Japanese Unexamined Patent Application Publication No. 7-36721 discloses a control method for taking data of a process from a processing apparatus in the current operation system over to a processing apparatus in a new operation system if a fault occurs in the processing apparatus in the current operation system, to continue the operation in the processing apparatus in the new operation system. In the control method, data used for investigating the cause of the fault is stored in a common storage device for fault analysis, and the data is referred to at switching to the new operation system to find the cause of the fault.

Japanese Unexamined Patent Application Publication No. 7-262034 discloses a data handover system in which non-volatile storage connected to a first data processing apparatus and a second data processing apparatus is provided, and handover data is stored in the non-volatile storage to perform the data handover at switching between a active system and a standby system.

In an information processing apparatus as an entire computer system, a server controlling the entire system, for example, a service processor, is provided. The service processor unit itself or firmware operated in the service processor unit is hereinafter referred to as an eXtended System Control Facility Unit (XSCFU). The XSCFU has a function for monitoring fault occurred in the hardware including the XSCFU in the control of the entire system.

An asynchronous communication method is used for error notification in the fault monitoring. In asynchronous communication, since an information source does not wait for completion of process at the information destination, the asynchronous communication method has the advantage in that multiple processing requests may concurrently be submitted or other process may be performed concurrently with the processing requests.

However, when the asynchronous communication method is used in the error notification, the following problems may occur. If requested process is interrupted and is not completed because of a fault occurred in the XSCFU, for example, because of a fault occurred in an information communication path or an internal fault occurred in an information destination, the information source cannot detect that the processing requested of the information destination has failed. In this case, the processing requested of the information destination may not be completed and the information source cannot re-request the process of the information destination.

The XSCFU manages common data including non-volatile data and volatile data in order to control the entire system. Of the common data managed by the XSCFU, the non-volatile data includes a variety of setup information and degeneracy information about portion of the information processing apparatus during the operation of the system and is held even if the information processing apparatus is turned off. The volatile data includes the latest state of the system and is held only in a state where the information processing apparatus is turned on. If an abnormal state in the XSCFU is detected and the process requested by the information source is interrupted, update of the common data that should be performed by the information source is not undesirably performed.

SUMMARY

According to an aspect of the invention, an information processing apparatus includes a first processing unit, a second processing unit, and a common storage unit that is commonly accessed by the first processing unit and the second processing unit. The first processing unit writes a request for requesting the second processing unit to perform a certain process in the common storage unit, and notifies the second processing unit of the request. The second processing unit writes a notification indicating the process is completed in response to the request in the common storage unit.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 6A and 6B illustrate the content of non-volatile storage and volatile storage;

DESCRIPTION OF EMBODIMENTS

Embodiments of the present invention will herein be described with reference to the attached drawings. In the embodiments described below, information indicating an error detected in an information processing apparatus is transmitted between components in the information processing apparatus by the asynchronous communication method.

Figure 1:
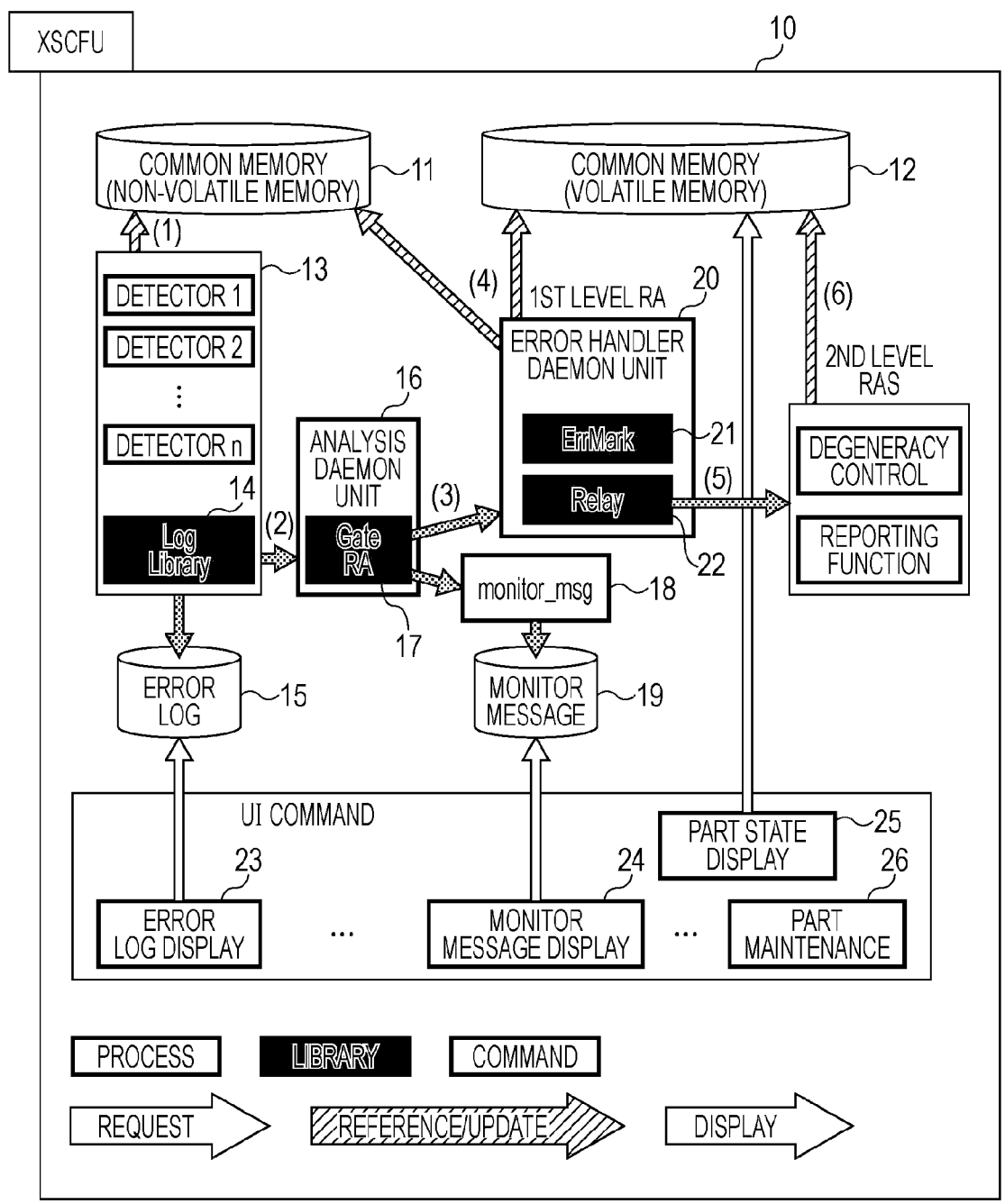
FIG. 1 illustrates transmission of error information in an XSCFU.

FIG. 1 illustrates transmission of error information in an XSCFU 10. Problems involved in the transmission of error information will now be described with reference to FIG. 1. Referring to FIG. 1, if an error occurs in the information processing apparatus, in Step (1), any of detectors 1 through n of a component 13 that has detected the error writes information indicating the type of the error occurred (referred to as "error type information") in a non-volatile memory 11 in a common memory. In Step (2), the component 13 that has detected the error issues an error log 15 via a Log Library 14. In Step (3), when an analysis daemon unit 16 receives the error log 15, a Gate RA 17 in the analysis daemon unit 16 transmits an event to an error handler daemon unit 20. The Gate RA 17 also transmits an event to a monitor_msg 18. The monitor_msg 18 writes a monitor message 19 in response to the transmitted event. In Step (4), at reception of the event from the analysis daemon unit 16, an ErrMark 21 in the error handler daemon unit 20, which is a 1st level RA, extracts the error type information stored in the non-volatile memory 11 into a volatile memory 12 as part state information. In Step (5), a Relay 22 in the error handler daemon unit 20 transmits an event to 2nd level RAs. In Step (6), at reception of the event from the error handler daemon unit 20, the 2nd level RAs write a fault report for a system manager in the volatile memory 12 and separate the portion of the information processing apparatus in which the fault has occurred. In other words, for example, the 2nd level RAs perform degeneracy of the faulty part.

When the system manager issues an error log display command 23 as a user interface (UI) command, the error log 15 is referred to. When the system manager issues a monitoring message display command 24, the monitor message 19 is referred to. When the system manager issues a part state display command 25, the part state information in the volatile memory 12 in the common memory is referred to. When the system manager issues a part maintenance command 26, the fault report in the part state information in the volatile memory 12 is referred to.

Figure 2:
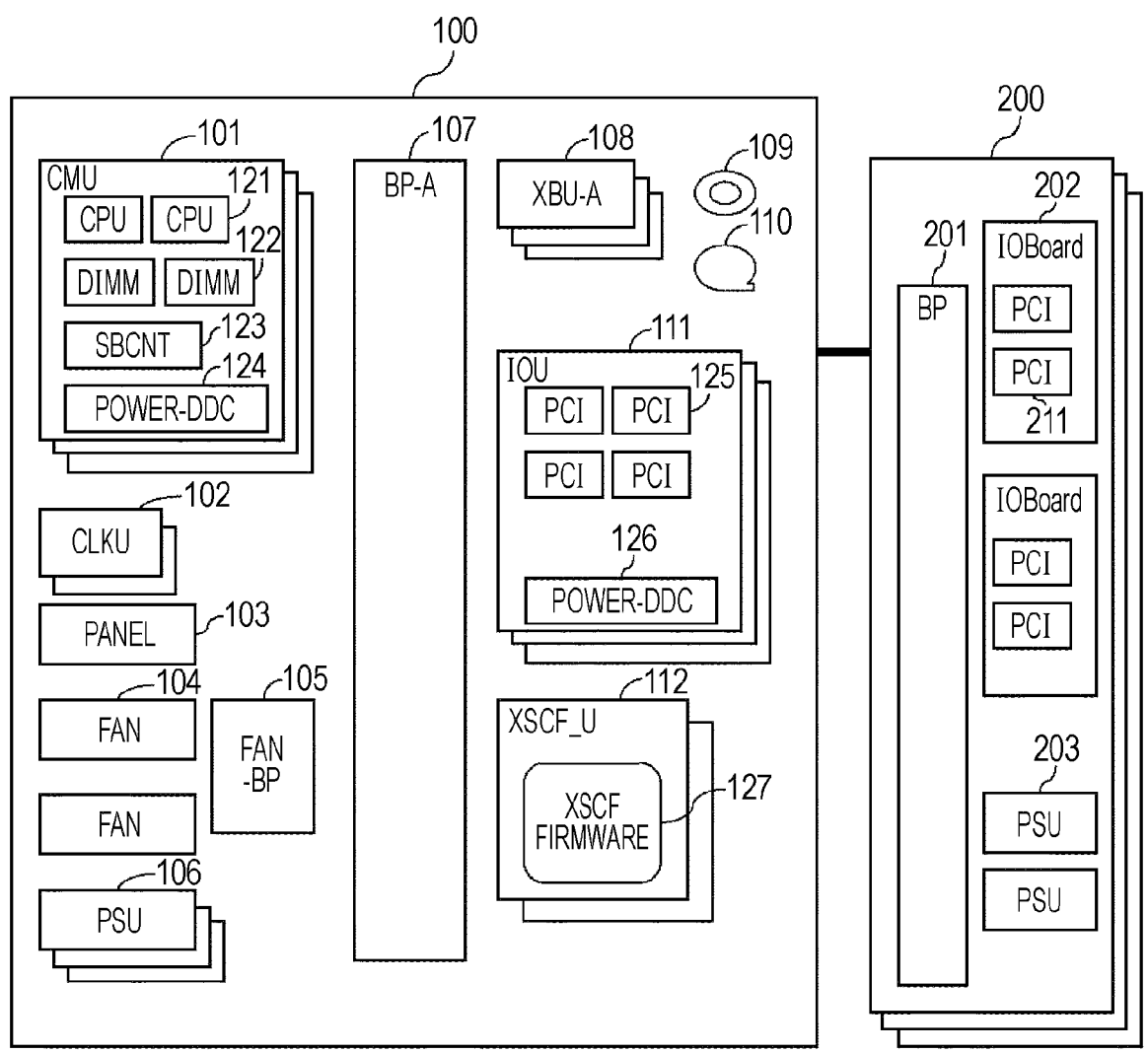
FIG. 2 is a block diagram illustrating an information processing system according to an embodiment of the present invention.

FIG. 2 is a block diagram illustrating an information processing system according to an embodiment of the present invention. In the information processing system illustrated in FIG. 2, multiple input-output (IO) boxes (IOBOXes) 200 are connected to the main body of an information processing apparatus 100. Referring to FIG. 2, the information processing apparatus 100 includes multiple central processing unit (CPU), memory board unit (CMUs) 101, multiple clock units (CLKUs) 102, a panel (PANEL) 103, multiple fans (FANs) 104, a fan backplane (FAN-BP) 105, multiple power supply units (PSUs) 106, a backplane (BP-A) 107, multiple crossbar units (XBU_As) 108, a digital versatile disk (DVD) reader-writer (DVD) 109, a digital audio tape reader (DAT) 110, multiple IO units (IOUs) 111, and multiple XSCF units (XSCF_Us) 112.

Each CMU 101 is a system board on which multiple CPUs 121 and multiple memories (DIMMs) 122 are mounted. The CMU 101 also includes a system board controller (SBCNT) 123 controlling the entire CMU 101, and a power supply unit (POWER-DDC) 124 supplying power to each unit mounted on the CMU 101.

Each clock unit 102 generates and supplies a clock signal to each unit in the information processing apparatus 100. The panel 103 has a power switch, other switches, and light emitting diodes (LEDs) operated by the system manager. Items to be indicated to the system manager are displayed on the panel 103. Each fan 104 is an air cooling fan for decreasing the temperature in the information processing apparatus 100. The fan backplane 105 is used to connect the fans 104 to the information processing apparatus 100. The power supply units 106 function as the power sources of the information processing apparatus 100.

The backplane 107 is used to connect the CMU 101 to the information processing apparatus 100.

The crossbar units 108 are used to logically switch the partitions of the multiple CMUs 101 mounted on the information processing apparatus 100. The DVD reader-writer 109 is a disk device that writes and reads data on and from a DVD that is loaded. The digital audio tape reader 110 is a tape reader that reads data on a digital audio tape. Each IO unit 111 is an IO board provided with multiple peripheral component interconnect (PCI) bus throttles 125 and a power supply unit (POWER-DDC) 126. Each XSCF unit 112 is a service processor unit provided with XSCF firmware 127.

Each IO box 200 includes a backplane (BP) 201, multiple IO boards (IO Boards) 202, and multiple power supply units (PSUs) 203.

The backplane 201 is used to connect the IO board 202 to the IO box 200. Each IO board 202 is provided with, for example, multiple PCI bus throttles 211. The power supply units 203 supply power to the IO box 200.

In the information processing system illustrated in FIG. 2, the XSCF units 112 control the entire information processing system. In the fault monitoring of the hardware included in the control of the entire information processing system, the information processing system according to the embodiment uses the asynchronous communication as the information communication method to notify any error occurring in the hardware.

Figure 3:
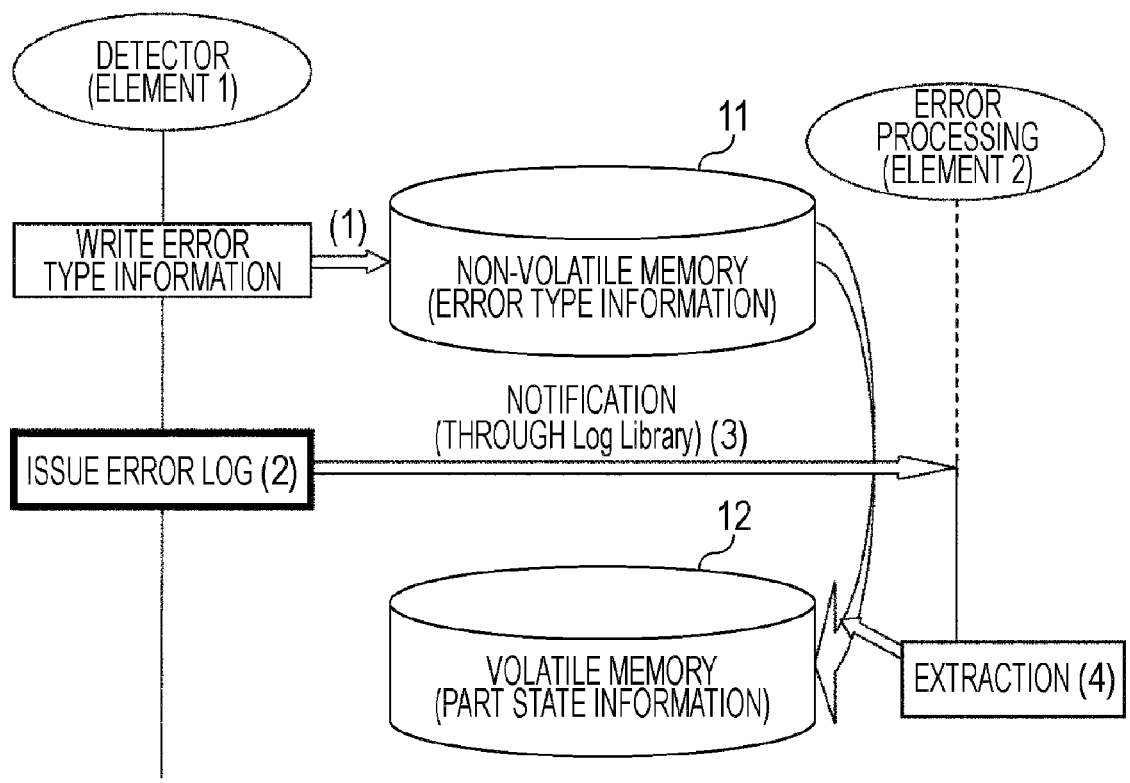
FIG. 3 illustrates a fault monitoring process using an asynchronous communication method.

Fault monitoring processes using the asynchronous communication will now be described. FIG. 3 illustrates a fault monitoring process using the asynchronous communication. Referring to FIG. 3, an element 1 corresponds to the component (detector) 13 in the information processing apparatus, which has detected an error, and an element 2 corresponds to the error handler daemon unit 20 performing error process.

A process performed by the element 1 and the element 2 will now be described with reference to FIG. 3. Element 1: If the element 1 detected an error occurred in the information processing apparatus, in Step (1), the element 1 writes error type information corresponding to the detected error in the non-volatile memory 11. In Step (2), the element 1 issues an error log. In Step (3), the analysis daemon unit 16 transmits an event to the element 2 on the basis of the issued error log. The event is transmitted to the element 2 via the Log Library 14 where the error log is stored.

Element 2: In Step (4), the error handler daemon unit 20 extracts the error type information stored in the non-volatile memory 11 into the volatile memory 12 as part state information on the basis of the notification from the element 1.

In the process illustrated in FIG. 3, if the element 1 is abnormally interrupted before Step (3), there is a possibility in that the process performed by the element 2 triggered by the asynchronous notification from the element 1 may not be performed.

Figure 4:
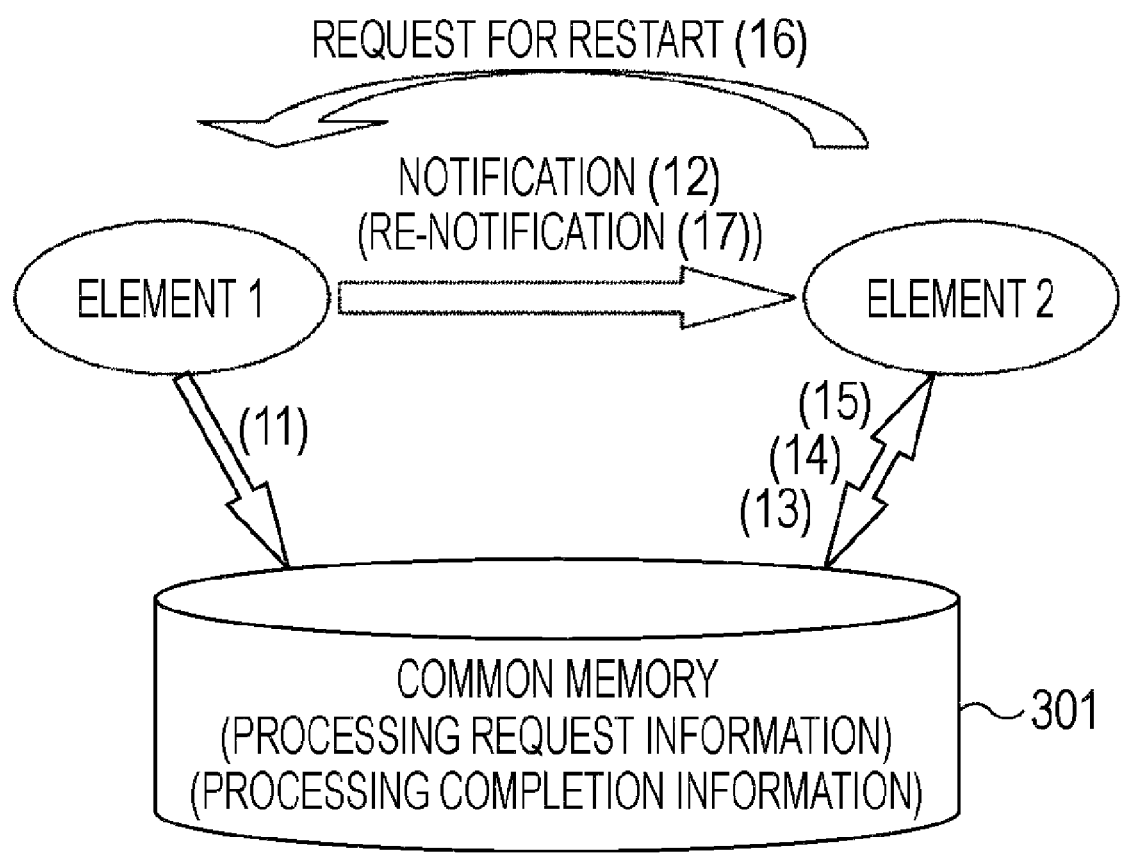
FIG. 4 illustrates a fault monitoring process using the asynchronous communication method according to an embodiment of the present invention.

FIG. 4 illustrates a fault monitoring process using the asynchronous communication according to an embodiment of the present invention. Referring to FIG. 4, if an element 1 detects an error, the element 1 notifies an element 2 that performs an error recovery process of information about the error in asynchronous communication. The element 1 and the element 2 denote components transmitting information.

A process performed by the element 1 and the element 2 will now be described with reference to FIG. 4. Element 1: In Step (11), the element 1 writes information on a request for requesting the element 2 to perform a certain process (referred to as "processing request information") in a common memory 301 storing common data. In Step (12), the element 1 notifies the element 2 of the request by asynchronous communication. If the element 1 is requested to restart the process from the element 2 in Step (16) to be described below, then in Step (17), the element 1 notifies the element 2 again of the request by asynchronous communication. The common memory 301 is a non-volatile memory.

Element 2: In Step (13), the element 2 refers to the common memory 301 in response to the notification from the element 1 in Step (12) to perform a certain process based on the processing request information stored in the common memory 301. After the element 2 performs the process, then in Step (14), the element 2 writes information on completion of the process indicating that the process performed by the element 2 is completed (referred to as "processing completion information") in the common memory 301.

In Step (15), the element 2 refers to the common data stored in the common memory 301 at restart of the operation by an external device or the element 2, to check whether element 2 completed the process. If the process is not completed, then in Step (16), the element 2 requests the element 1 to restart the process that is not completed. Then, the element 2 receives the re-notification in Step (17) from the element 1.

In the fault monitoring process by asynchronous communication according to the embodiment, the element 2 writes the processing completion information in the common data storage unit. In addition, the element 2 refers to the common data stored in the common memory 301, which is a non-volatile memory, at startup to check whether the process by the element 2 is completed or not. If the element 2 determines that the process by the element 2 is not completed, the element 2 issues an error log to the element 1 to request the element 1 to restart the process.

According to the embodiment, at restart after the abnormal interruption, the element 2 may restart the process that has been abnormally interrupted in response to the notification of restart of the process received from the element 1.

Figure 5:
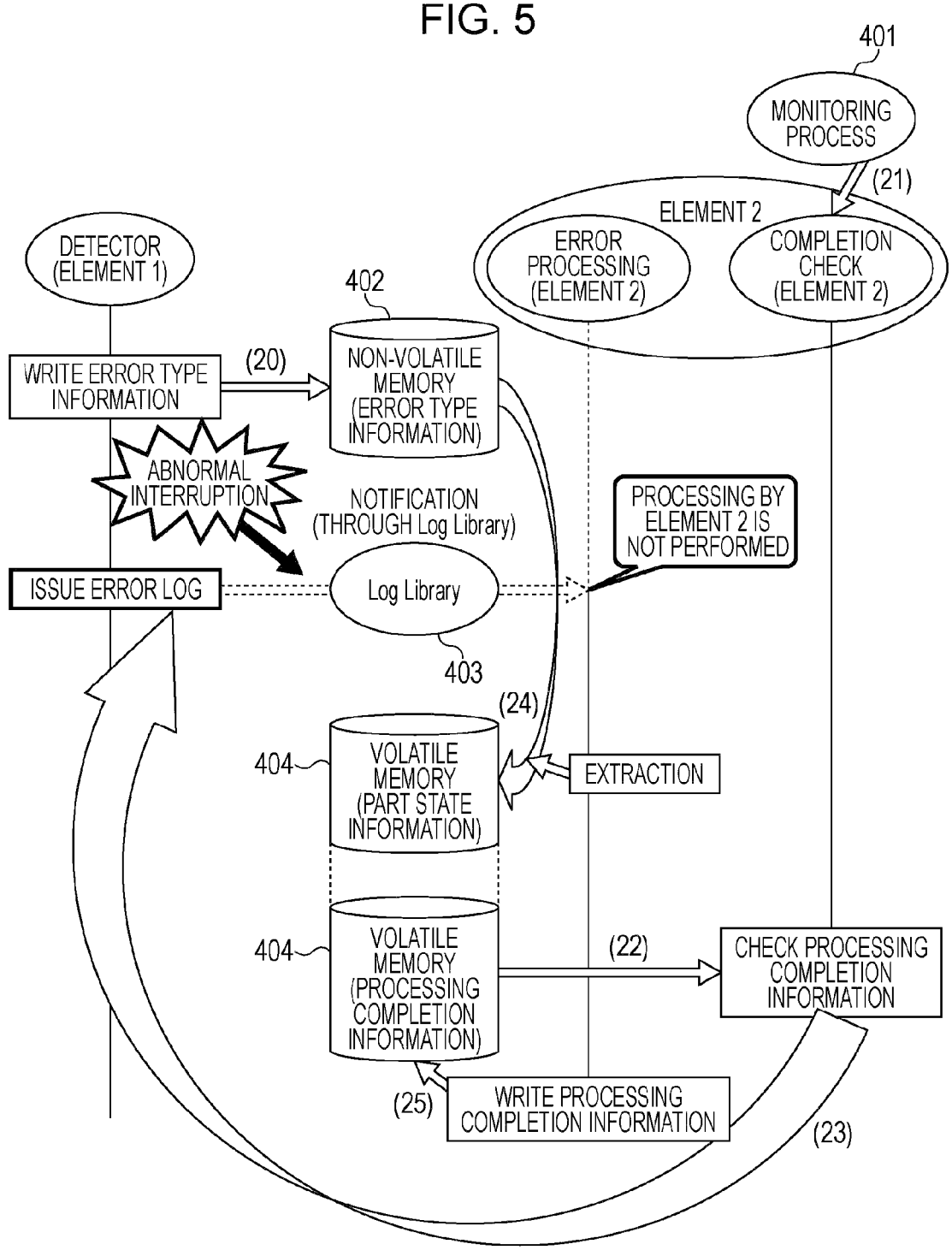
FIG. 5 illustrates a method for implementing the faulty monitoring process using the asynchronous communication method performed by the XSCFU, according to the embodiment of the present invention.

A method of implementing the faulty monitoring process using the asynchronous communication according to the embodiment will now be described. FIG. 5 illustrates a method of implementing the faulty monitoring process using the asynchronous communication according to the embodiment. This method is performed by the XSCFU. FIG. 5 indicates how to implement the faulty monitoring process by the element 2 illustrated in FIG. 4 that requests restart of the process.

Referring to FIG. 5, an element 1 corresponds to the component 13 that has detected an error, and an element 2 corresponds to the error handler daemon unit 20. In Step (20), the element 1, which is the detector that has detected the error, writes error type information in a non-volatile memory 402 storing non-volatile data. The error type information written in the non-volatile memory 402 corresponds to the processing request information in FIG. 4. Then, the element 1 issues an error log. It is assumed that an abnormal state occurs in the XSCFU while the element 1 notifies the element 2 of the error log via a Log Library 403 and the notification of the error log to the element 2 is interrupted.

In a monitoring process 401 in the element 2, in Step (21), a 1st level RA completion check, which is one of the functions of the ErrMark library, is invoked when the XSCFU is recovered from the abnormal state. The 1st level RA completion check corresponds to the error handler daemon unit 20, and is illustrated as "completion check (element 2)" in FIG. 5. Checking of completion of the process and issuance of the error log are performed in the 1st level RA completion check.

The element 2 performs the following process when the process is invoked from the monitoring process 401. First, in Step (22), the element 2 refers to a volatile memory 404 storing volatile data to check whether the processing completion information concerning the element 2 exists in the volatile memory 404 or not.

The error type information written in the non-volatile memory 402 by the element 1 in Step (20) is normally supposed to be extracted into the volatile memory 404, and the processing completion information indicating the completion of the process by the element 2 is normally supposed to be written in the volatile memory 404. However, in the case where the notification of the error log from the element 1 to the element 2 is interrupted as in the example illustrated in FIG. 5, the processing completion information concerning the element 2 is not written in the volatile memory 404, because the element 2 does not perform the process that should be performed by the element 2. Accordingly, if the checking in Step (22) shows that the processing completion information is not written in the volatile memory 404, then in Step (23), the element 2 determines that the process for the error that has been detected is not completed, and causes the element 1, which is the detector of the error, to issue an error log. After the error log is issued from the element 1 in Step (23), then in Step (24), the element 2 performs the error process again in response to the issuance of the error log, and extracts the error type information stored in the non-volatile memory 402 into the volatile memory 404 as part state information. When the error process performed by the element 2 is completed, then in Step (25), the element 2 writes the processing completion information in the volatile memory 404.

With the process illustrated in FIG. 5, even if the error process by the element 2 is not completed for some reason, the processing completion information written in the volatile memory 404 can be checked to determine whether the error process is completed or not. If the error process is not completed, the error process is performed again. Accordingly, the series of operations involved in the information transmission is ensured even by the fault monitoring process using the asynchronous communication method.

The content of non-volatile data and volatile data written by the element 1 and the element 2 in FIG. 5 will now be described. FIGS. 6A and 6B illustrate the content of the non-volatile memory 402 and the volatile memory 404, which is used as common data. FIG. 6A illustrates non-volatile data stored in the non-volatile memory 402, and FIG. 6B illustrates volatile data stored in the volatile memory 404.

Referring to FIG. 6A, the non-volatile data stored in the non-volatile memory 402 includes setup information, degeneracy information, and other information. The setup information is used for the operation of the XSCFU. The degeneracy information is written by the element 1 that has detected an error in Step (20) in FIG. 5, and is referred to by the element 2 in Step (24) in FIG. 5. The degeneracy information includes the error type information indicating part of the information processing apparatus for which the element 1 has detected an error. In the example in FIG. 6(A), the error type information is recorded for each part from part A to part n. One-bit information indicating whether or not various error types exist is stored for every error type as the error type information. In the example in FIG. 6A, "0" or "1" is set for each of 32 error types from an error type 0 to an error type 31.

The volatile data illustrated in FIG. 6B includes part information and latest system information indicating various states of the information processing system. The part information is generated by the element 2 that refers to the non-volatile data and extracts the non-volatile data in Step (24) in FIG. 5. The part information concerns each part composing the information processing system targeted for the fault monitoring process. In the example in FIG. 6B, the part information about parts from part A to part n is recorded in the volatile memory 404. The part information includes the part state information, which is a copy of the error type information in the non-volatile information in FIG. 6A, and processing information (i.e., a process performed/status/state in relation to the target part). Either of "0" or "1" is set as the processing information for every process. In the example in FIG. 6B, a bit indicating whether each part is mounted is recorded in association with "part mounting." Similarly, a bit indicating whether the error type information is updated and the error process is completed is recorded in association with "processing completion." For example, information indicating whether each part is in an alarm state or in a warning state is recorded in the "processing completion."

If the element 1 detects an error, the element 1 writes the error type information corresponding to each part in the non-volatile data and issues an error log. The element 2 performing the error process refers to the error type information in the non-volatile data to extract the error type information into the volatile data as the part state information. When the error process is completed, the element 2 writes the processing completion information indicating the completion of the process in the volatile data.

In addition, the element 2 refers to the part state information in the volatile data in FIG. 6B. If the part state information is not extracted from the non-volatile data (e.g., if determined that part state information exists in the non-volatile memory, but corresponding part state information is not present, for example, not stored or has not been retained, in the volatile memory) or the processing completion information corresponding to the part state information in the volatile memory does not indicate the completion even if the part state information is extracted into the volatile memory, the element 2 requests the element 1, which is the detector of the error, to restart the error process.

Figure 7:
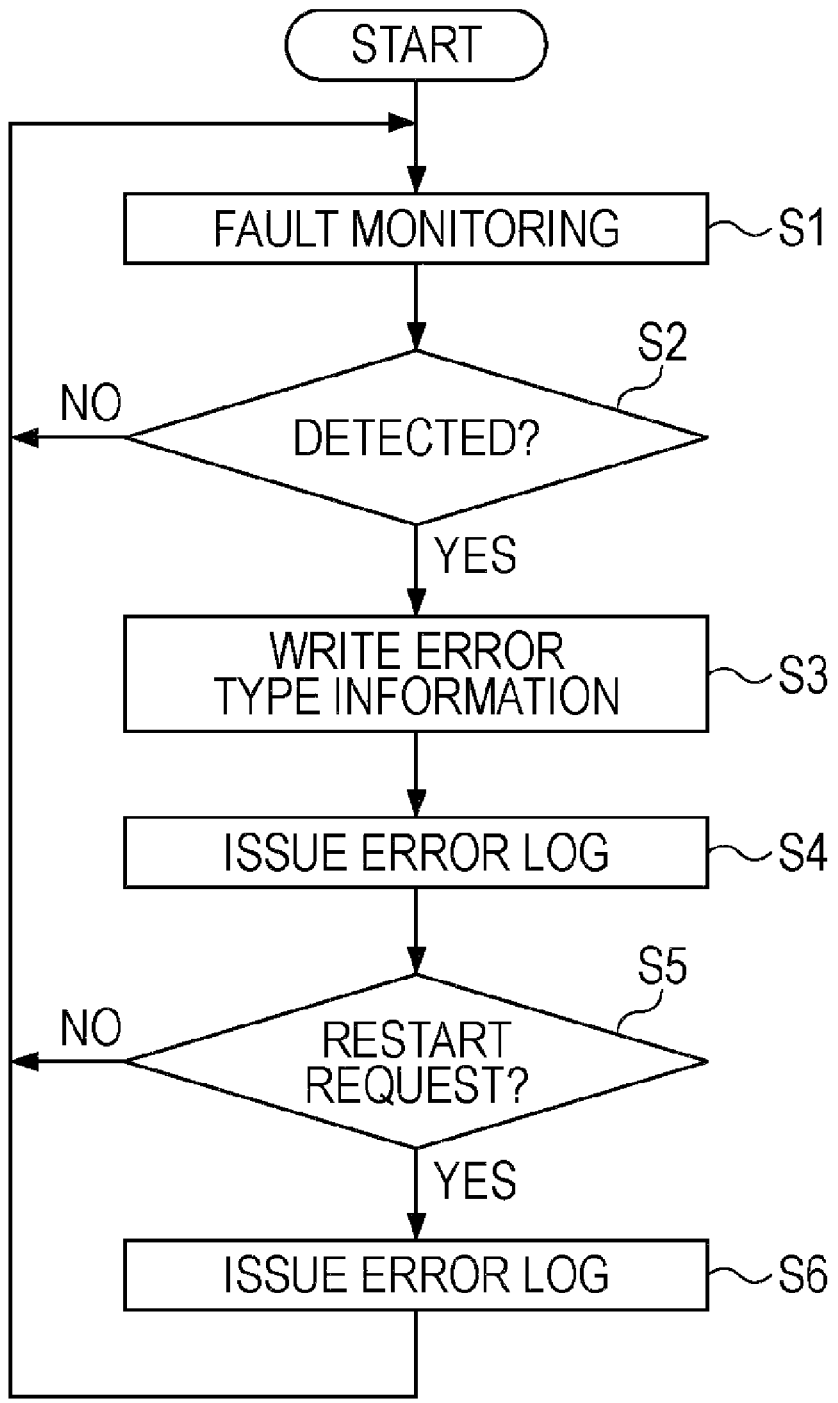
FIG. 7 is a flowchart illustrating a process performed by an error detection component according to an embodiment of the present invention.

FIG. 7 is a flowchart illustrating a process performed by the element 1, which is the component that has detected an error (error detection component), according to the embodiment. The process in FIG. 7 is performed by the XSCF unit 112 in FIG. 2 that executes the XSCF firmware 127.

Referring to FIG. 7, in Step S1, the error detection component performs the fault monitoring in the information processing apparatus 100. In Step S2, the error detection component determines whether an abnormal state is detected or not. If no abnormal state is detected (No in Step S2), the process goes back to Step S1 to continue the fault monitoring.

If an abnormal state is detected in Step S2 (YES in Step S2), then in Step S3, the error detection component writes the error type information in the non-volatile memory. In Step S4, the error detection component issues an error log.

In Step S5, the error detection component determines whether or not a restart request is submitted from the element 2 corresponding to the error handler daemon unit 20 during Steps S1 to S4. If the error detection component determines that no restart request is submitted from the error handler daemon unit 20 during Steps S1 to S4 (NO in Step S5), the process goes back to Step S1 to continue the fault monitoring. If the error detection component determines that a restart request is submitted from the error handler daemon unit 20 (YES in Step S5), then in Step S6, the error detection component issues an error log corresponding to the error process requested from the error handler daemon unit 20. Then, the process goes back to Step S1. The error detection component repeats Steps S1 to S6.

Figure 8:
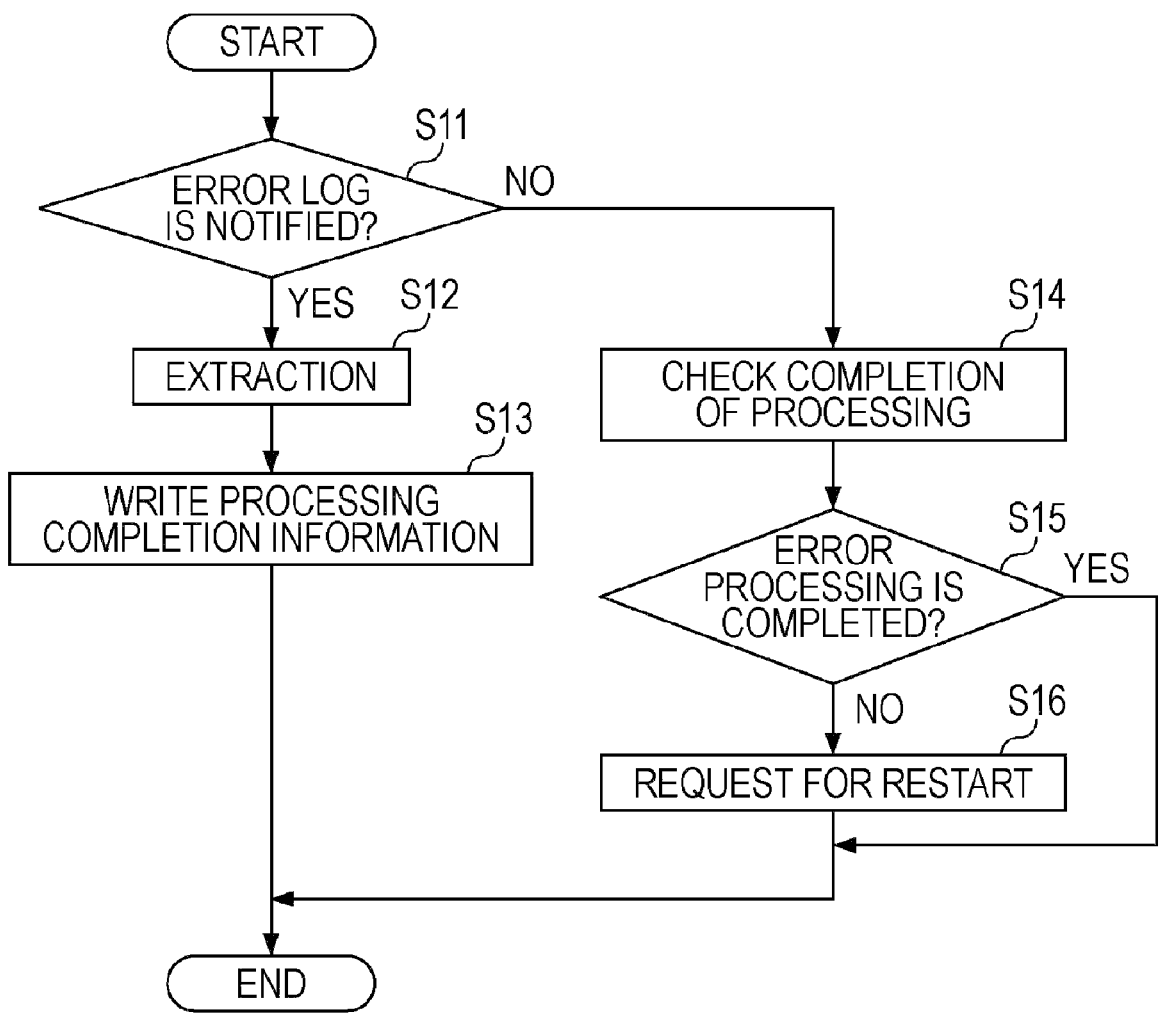
FIG. 8 is a flowchart illustrating a process performed by an error handler daemon unit according to an embodiment of the present invention.

FIG. 8 is a flowchart illustrating a process performed by the element 2 corresponding to the error handler daemon unit 20 according to the embodiment. Referring to FIG. 8, in Step S11, the error handler daemon unit 20 determines whether an error log issued by the element 1, which is the error detection component, is notified via the Log Library 403. If the error handler daemon unit 20 determines that an error log is notified via the Log Library 403 (YES in Step S11), then in Step S12, the error handler daemon unit 20 extracts the error type information stored in the corresponding non-volatile memory into the volatile memory. In Step S13, the error handler daemon unit 20 writes the processing completion information indicating the completion of the process in the volatile memory. Then, the process in FIG. 8 is terminated.

If the error handler daemon unit 20 determines that no error log is notified via the Log Library 403 (NO in Step S11), then in Step S14, the error handler daemon unit 20 refers to the part information stored in the volatile memory to check the previous error process. In Step S15, the error handler daemon unit 20 determines whether the previous error process is completed or not.

If the error handler daemon unit 20 determines that a previous error process is not completed (NO in Step S15), then in Step S16, the error handler daemon unit 20 requests the error detection component to restart the process. Then, the process in FIG. 8 is terminated. If the error handler daemon unit 20 determines that all the previous error processes are completed (YES in Step S15), the process skips Step S16 and the process in FIG. 8 is terminated.

As described above, according to the embodiment, even if the error process is not completed for some reason, the non-completion of the process is detected and the error handler daemon unit 20 is restarted to complete the process that has not been completed. Accordingly, the inconsistency in the error type information between the volatile data and the non-volatile data does not occur even when the asynchronous communication method is used for the transmission of the error information.

Even if the abnormal interruption occurs, the error log or the monitoring message is prevented from not being generated (i.e., the error log or the monitoring message is generated even in case of an abnormal interruption of the error log or the monitoring message). In addition, the error report is prevented from not being delivered to the system manager and the degeneracy operation of a faulty part is prevented from not being performed.

Figure 9:
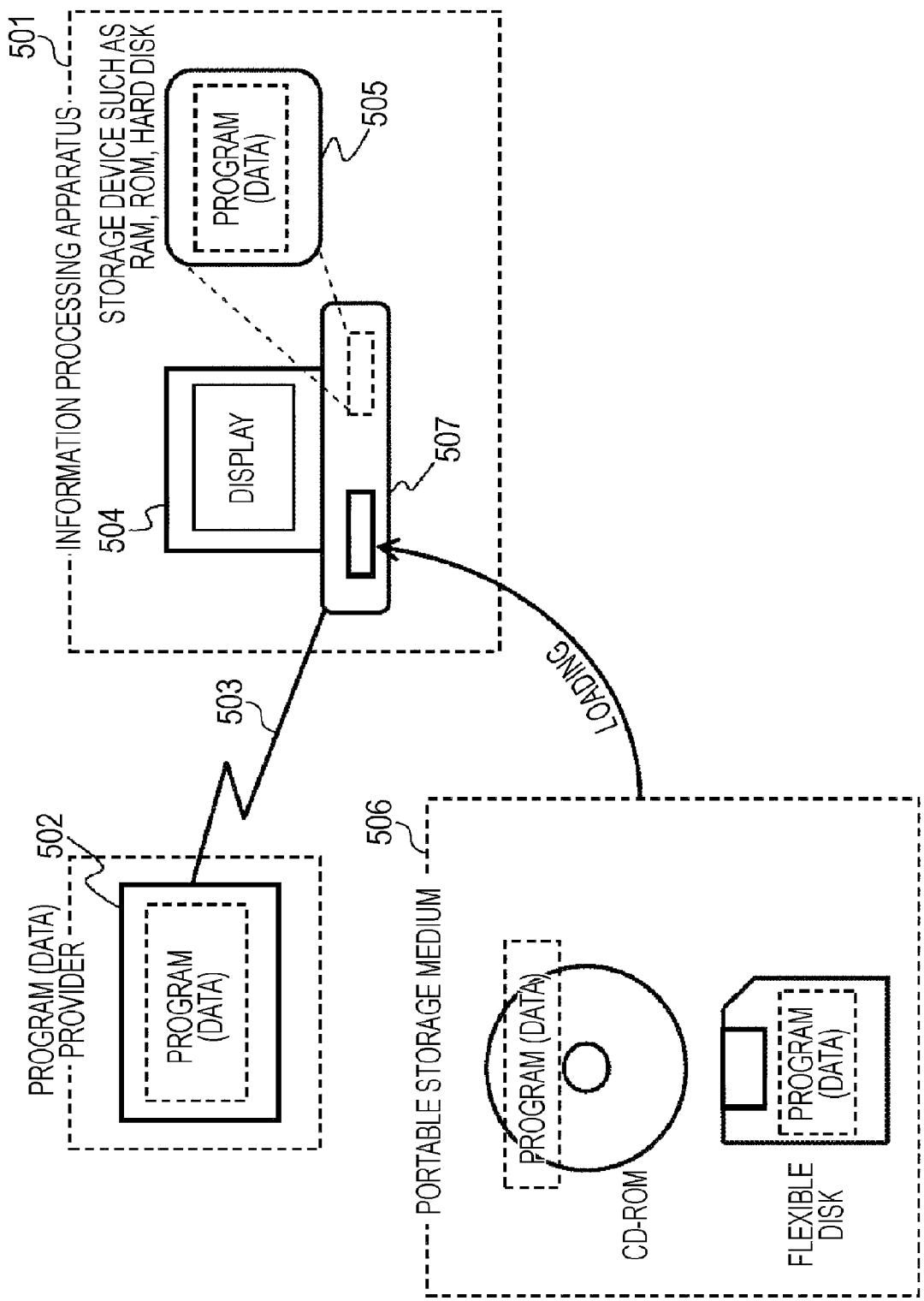
FIG. 9 illustrates a storage medium according to an embodiment of the present invention.

A storage medium according to the embodiment will now be described. FIG. 9 illustrates the storage medium according to the embodiment. Referring to FIG. 9, in an information processing apparatus 501 according to an embodiment of the invention, a medium driving unit 507 loads a terminal-side DL program stored in a portable storage medium 506, such as a magnetic tape, a flexible disk, a compact disk-read only memory (CD-ROM), a magneto-optical disk (MO), or a digital versatile disk (DVD), in a non-volatile memory in the target information processing apparatus 501 through a network line 503.

Program software may be exchanged by using the portable storage medium 506, such as a CD-ROM, in the information processing apparatus 501 illustrated in FIG. 9. Accordingly, the present invention may be embodied by the portable storage medium 506 or a program which causes the information processing apparatus 501 to perform the functions/operations according to the embodiments described above and from which the information processing apparatus 501 can read data, in addition to the information processing apparatus and the error processing method.

In this case, the portable storage medium 506, such as a CD-ROM, a flexible disk, an MO, a DVD, a memory card, or a removable hard disk, which is removable from the medium driving unit 507; a storage unit 502 in an external apparatus from which data is transmitted through the network line 503; or a memory 505, such as a random access memory (RAM), a read only memory (ROM), or a hard disk, in a main body 504 of the information processing apparatus 501 may be used as the "storage medium." The program stored in the portable storage medium 506 or the storage unit 502 is loaded in the target information processing apparatus 501 through the network line 503.

According to an aspect of the embodiments of the invention, any combinations of the described features, functions, operations, and/or benefits can be provided. The embodiments can be implemented as an apparatus (machine) that includes computing hardware (i.e., computing apparatus 100), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus comprises a controller (CPU) (e.g., a hardware logic circuitry based computer processor that processes or executes instructions, namely software/program), computer readable recording media, transmission communication media interface (network interface), and/or a display device, all in communication through a data communication bus. The results produced can be displayed on a display of the apparatus. A program/software implementing the embodiments may be recorded on computer readable media comprising computer-readable recording media. The program/software implementing the embodiments may also be included/encoded and transmitted over transmission communication media.

Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. Further, present invention may be embodied by using various mass storage media as computer-readable recording media that will be developed, in addition to the storage medium such as a CD-ROM and a DVD-ROM described above. The mass storage media include a next-generation optical disk storage medium, such as a Blu-ray Disc (registered trademark) or an Advanced Optical Disc (AOD), using a blue laser, an HD-DVD9 using a red laser, and a Blue Laser DVD and a hologram using a blue-violet laser. Examples of transmission communication media include a carrier-wave signal, an optical signal, etc.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An information processing apparatus comprising:
a first processing unit;
a second processing unit; and
a common storage unit that is commonly accessed by the first processing unit and the second processing unit, the common storage unit includes a non-volatile storage area and a volatile storage area,
wherein the first processing unit writes a request requesting the second processing unit to perform a process in the non-volatile storage area, and notifies the second processing unit of the request, and
wherein the second processing unit writes a notification indicating the process is completed in response to the request in the volatile storage area.

2. The information processing apparatus according to claim 1,
wherein the second processing unit extracts the request stored in the non-volatile storage area into the volatile storage area, and refers to the extracted request in the volatile storage area and, if the second processing unit determines a non-completed process remains, requests the first processing unit to restart the non-completed process.

3. The information processing apparatus according to claim 1,
wherein, at restart of the information processing apparatus, the second processing unit refers to the request stored in the non-volatile storage area and the notification corresponding to the request stored in the volatile storage area to determine whether the process corresponding to the request is completed based upon the request and the notification corresponding to the request and, if the process corresponding to the request is not completed, the second processing unit performs the process corresponding to the request.

4. The information processing apparatus according to claim 1, wherein the writing of the request into the non-volatile storage area is performed prior to the notification of the request to the second processing unit.

5. The information processing apparatus according to claim 1, wherein the process corresponding to the request is an error process.

6. The information processing apparatus according to claim 5,
wherein the second processing unit extracts error type information stored in the non-volatile storage area into the volatile storage area as the error process.

7. The information processing apparatus according to claim 6, wherein the second processing unit refers to the volatile storage area and, if an extraction of the error type information stored in the non-volatile storage area into the volatile storage area is not performed or the notification is not written in the common storage unit, the second processing unit determines that the error process is not completed.

8. The information processing apparatus according to claim 7,
wherein the second processing unit requests the first processing unit to restart the process that is not completed if the second processing unit determines that the error process that is not completed remains, and the first processing unit reissues an error log corresponding to the error process that is not completed.

9. The information processing apparatus according to claim 5, wherein the first processing unit detects an error occurring in the information processing apparatus, and the second processing unit processes the error detected by the first processing unit.

10. The information processing apparatus according to claim 1, wherein the notification from the first processing unit to the second processing unit is performed by an asynchronous communication.

11. An error processing method performed by an information processing apparatus that includes a storage unit having a first non-volatile storage part and a second volatile storage part, the method comprising:
   writing information by a first processor indicating a type of a detected error in the first non-volatile storage part;
   notifying the type of detected error to a second processor that performs an error process;
   performing by the second processor the error process corresponding to the notified error type; and
   storing by the second processor information indicating completion of the error process in the second volatile storage part when the error process is completed.

12. The error processing method according to claim 11, wherein, if the second volatile storage part of the storage unit is referred to and it is determined that an error process which is not completed exists, the first storage part is rewritten with the detected error for re-notification to the second processor.

13. A computer-readable recording medium storing a program causing the computer to perform:
   writing by a first processing unit an error type indicating a type of a detected error in a non-volatile storage area of a storage unit;
   notifying by the first processing unit the error type of the detected error to a second processing unit that performs an error process;
   performing by the second processing unit the error process corresponding to the detected error; and
   storing by the second processing unit the information indicating completion of the error process in a volatile storage area of the storage unit when the error process is completed.

* * * * *